United States Patent [19]

Kawabata et al.

[11] Patent Number: 4,585,028
[45] Date of Patent: Apr. 29, 1986

[54] MOTOR-DRIVEN PROPORTIONAL FLUID FLOW CONTROL VALVE

[75] Inventors: Yasuhiro Kawabata, Anjyo; Shoji Ito; Noriyoshi Shibata, both of Nagoya; Mitsunori Sasano; Fusaji Ohmura, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 533,945

[22] Filed: Sep. 20, 1983

[30] Foreign Application Priority Data

Sep. 21, 1982 [JP] Japan ............................... 57-163249

[51] Int. Cl.$^4$ ........................ F16K 31/04; F16K 31/08
[52] U.S. Cl. ................................................ 137/625.48
[58] Field of Search ........................ 251/129, 139, 141; 137/625.65

[56] References Cited

U.S. PATENT DOCUMENTS

| | | |
|---|---|---|
| 3,099,280 | 7/1963 | Holzbock .................. 137/625.65 X |
| 3,688,495 | 9/1972 | Fehler et al. .................. 251/141 X |
| 4,227,443 | 10/1980 | Toot ........................... 137/625.62 X |
| 4,291,358 | 9/1981 | Dettmann et al. .............. 251/129 X |
| 4,350,319 | 9/1982 | Kawata et al. ............. 137/625.48 X |
| 4,368,759 | 1/1983 | Akagi . | |

Primary Examiner—Arnold Rosenthal
Attorney, Agent, or Firm—Finnegan, Henderson, Farabow, Garrett & Dunner

[57] ABSTRACT

A motor-driven proportional fluid flow control valve has a linear motor including a slide valve body slidably mounted on a hollow iron core and an electromagnetic coil wound around the iron core. After a drive circuit has been energized, a constant current is passed through the electromagnetic coil to keep the slide valve body spaced from a stop surface while cutting off fluid communication between an inlet port and an outlet port. With the slide valve body out of contact with the stop surface, the slide valve does not produce noise which would otherwise be given off due to a fluctuating current flowing, through or vibrations of, the electromagnetic coil.

3 Claims, 2 Drawing Figures

MOTOR-DRIVEN PROPORTIONAL FLUID FLOW CONTROL VALVE

BACKGROUND OF THE INVENTION

The present invention relates to a motor-driven proportional fluid flow control valve, and more particularly to a motor-driven proportional fluid flow control valve having an electromagnetic coil supplied with a constant current for closing the valve with a slide valve body spaced from a valve stop surface.

Motor-driven proportional fluid flow control valves have an electromagnetically operated linear motor for opening and closing a slide valve body to allow a fluid to flow at a rate substantially proportional to a current applied to the linear motor. Such motor-driven proportional fluid flow control valves have found wide use in automobile emission control devices. In such an application, the valve has an inlet port connected to an air cleaner and an outlet port connected to a carburetor and an air bleed port. The current supplied to the valve is varied dependent on signals representative of the vacuum, temperature and rpm of the engine for controlling the amount of air flowing through the air bleed port to achieve a carburetor air-fuel ratio required for an exhaust gas density optimum for a three-way catalyst used.

When the motor-driven proportional fluid flow control valve is closed, the slide valve body is urged by a spring to be held at its end against a stop surface of a valve casing. This is disadvantageous in that the slide valve body tends to hit the stop surface repeatedly and produce striking sounds, owing to the duty frequency of a small current which flows through the electromagnetic coil, as well as the vibration thereof, when a drive circuit starts operating. One solution to this problem has been to use a damper such as of rubber for suppressing such striking sounds. However, the rubber damper has proven unsatisfactory in that it has a limited service life.

SUMMARY OF THE INVENTION

It is an object of the present invention to provide a motor-driven proportional fluid flow control valve having means for keeping a slide valve body spaced from a stop surface at all times after a drive circuit has been energized, thereby preventing the slide valve body from hitting the stop surface and thus from producing noise.

According to the present invention, a slide valve body of a linear motor housed in a casing of a motor-driven proportional fluid flow control valve is kept spaced from a stop surface by passig a constant current through an electromagnetic coil wound around the slide valve body, while preventing fluid communication between an inlet port and an outlet port. The slide valve body thus spaced from the stop surface does not give off noise which would otherwise be produced due to a fluctuating current flowing through, or vibrations of, the electromagnetic coil. The constant current is adjustably supplied from a drive circuit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
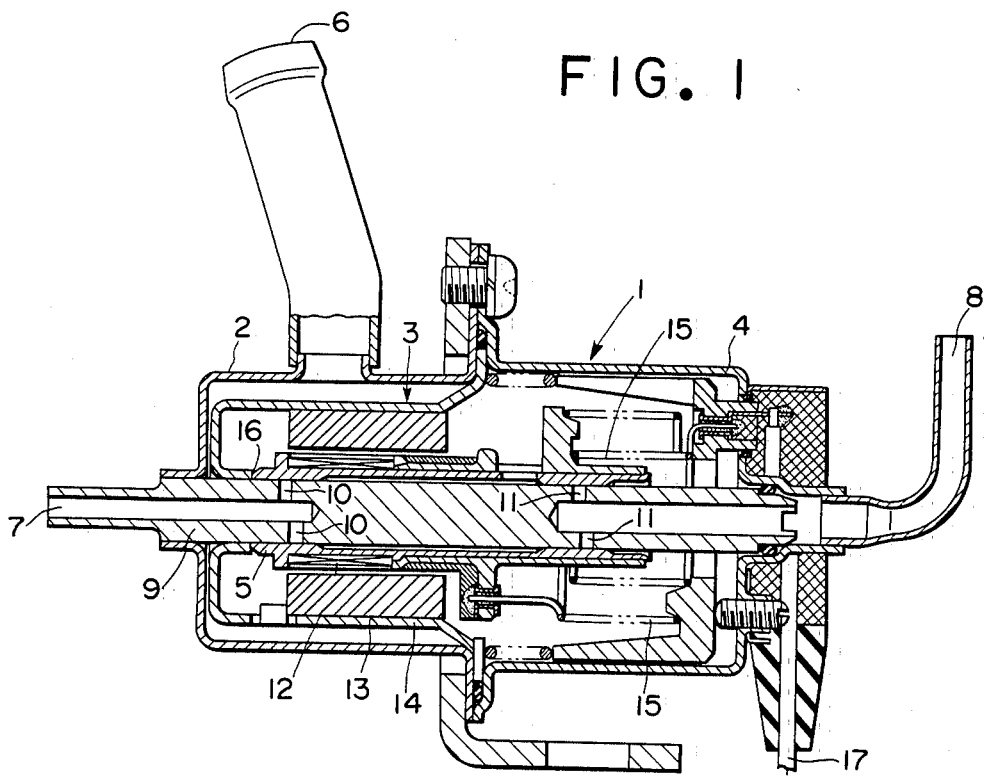
FIG. 1 is a cross-sectional view of a motor-driven proportional fluid flow control valve according to the present invention.

As shown in FIG. 1, a motor-driven proportional fluid flow control valve 1 comprises a moving-coil type linear motor 3 housed in a casing 2 having a side opening closed off by a cover 4 fastened to the casing 2. The valve 1 also includes a slide valve body 5 displaceable in response to energization of the linear motor 3 for selectively controlling the flow of a fluid from an inlet port 6 to a first outlet port 7 and a second outlet port 8.

The moving-coil type linear motor 3 has a hollow iron core 9 having the outlet ports 7, 8 in its opposite ends. The first outlet port 7 can communicate with the inlet port 6 through passages 10, and the inlet port 6 can communicate with the second outlet port 8 through passages 11. The slide valve body 5 is in the form of a bobbin of nonmagnetic material slidably fitted over the hollow iron core 9, there being an electromagnetic coil 12 wound around the bobbin 5. A pair of permanent magnets 13, 13 is disposed in diametrically opposite relation to produce magnetic fluxes passing perpendicularly through the windings of the electromagnetic coil 12. A yoke 14 of magnetic material cooperates with the permanent magnets 13 and the iron core 9 in completing a magnetic circuit and is accommodated in the casing 2. The bobbin 5 slidable on the outer peripheral surface of the iron core 9 serves to open and close the passages 10, 11.

The bobbin 5 is normally urged by coil springs 15 to move leftward as shown in FIG. 1 into abutment at a lefthand end thereof against a stop surface 16 of the yoke 14. The electromagnetic coil 12 is electrically connected to a drive circuit through the springs 15 and a cable cord 17.

When the electromagnetic coil 12 remains de-energized as shown in FIG. 1, the magnetic fluxes from the permanent magnet 13 form a closed magnetic circuit through the iron core 9 and the yoke 14 and partly through the electromagnetic coil 12. When a current flows through the electromagnetic coil 12, the latter is subjected to a force proportional to the magnitude of the current and tending to displace the bobbin 5 to the right (as shown in FIG. 1) against the resiliency of the coil springs 15. The bobbin 5 now opens the passages 10 to the extent proportional to the applied current, allowing the fluid to flow from the inlet port 6 to the first outlet port 7.

Figure 2:
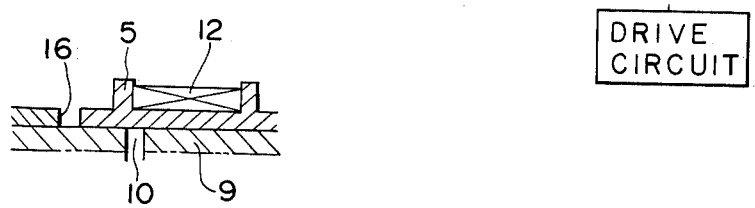
FIG. 2 is a fragmentary cross-sectional view showing the manner in which a bobbin is actuated when a primary constant current flows through an electromagnetic coil.

When the drive circuit is energized, a primary constant current flows through the electromagnetic coil 12. The primary constant current is of a magnitude large enough to displace the bobbin 5 out of contact with the stop surface 16, but not large enough to open the passages 10 as shown in FIG. 2. By thus passing the primary constant current through the electromagnetic coil 12, the bobbin 5 is prevented from hitting the stop surface 16 and thus producing striking sounds or noise. When the passages 10 are to be opened, the electromagnetic coil 12 is supplied with a secondary current which enables the bobbin 5 to open the passages 10 adjustably dependent on the vacuum, temperature, and rpm of the engine with which the fluid flow control valve 1 is associated. The primary constant current is effective in keeping the bobbin 5 spaced from the stop surface 16 and eliminating unwanted noise upon energization of the drive circuit, without impairing in any way the desired operation of the motor-driven proportional fluid flow control valve 1.

Although a certain preferred embodiment has been shown and described, it should be understood that many changes and modifications may be made therein without departing from the scope of the appended claims.

What is claimed is:

1. A motor-driven proportional fluid flow control valve comprising:
    (a) a casing having an inlet port;
    (b) a linear motor housed in said casing and including an iron core having first and second outlet ports, first and second passages in said core, a slide valve body slidably movable on said iron core for selectively providing communication between said inlet port and said first and second passages, respectively, an electromagnetic coil on said slide valve body, and a plurality of permanent magnets disposed adjacent to said electromagnetic coil;
    (c) a stop surface in said casing;
    (d) a coil spring disposed in said casing for normally urging said slide valve toward said stop surface to close said first and second passages; and
    (e) electrical means for passing a first constant current through said electromagnetic coil for generating an electromagnetic field having a first intensity for maintaining said slide valve body in spaced relation to said stop surface for reducing noise during valve operation caused by contact between said slide valve body and said stop surface, while maintaining said first passage closed, and for passing a second current through said electromagnetic coil for generating an electromagnetic field having a second intensity greater than said first electromagnetic field for opening said first passage.

2. A motor-driven proportional fluid flow control valve according to claim 1, wherein said linear motor includes a yoke mounted in said casing, said stop surface being formed on said yoke.

3. A motor-driven proportional fluid control valve comprising:
    (a) a casing having an inlet port;
    (b) a linear motor housed in said casing and including an iron core having first and second outlet ports, first and second passages in said core, a slide valve body slidably movable on said iron core for selectively providing communication between said inlet port and said first and second passages, respectively, an electromagnetic coil on said slide valve body, and a plurality of permanent magnets disposed adjacent to said electromagnetic coil;
    (c) a stop surface in said casing;
    (d) a coil spring disposed in said casing for normally urging said slide valve toward said stop surfce to close said first and second passages; and
    (e) electrical means including primary constant current means for generating an electromagnetic field having a first intensity for maintaining said slide valve body in spaced relation to said stop surface against the bias of said spring and simultaneously closing off said first passage, said means for reducing noise during valve operation, and secondary current means for generating an electromagnetic field having a second intensity greater than said first electromagnetic field for opening said first passage.

* * * * *